United States Patent
Kaushik

(10) Patent No.: US 10,862,814 B2
(45) Date of Patent: Dec. 8, 2020

(54) EXCEPTION HANDLING IN A MULTI-USER WIRELESS COMMUNICATION DEVICE BASED ON USER TAG VALUES

(71) Applicant: NXP USA, INC., Austin, TX (US)

(72) Inventor: Arvind Kaushik, Ghaziabad (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/364,598

(22) Filed: Mar. 26, 2019

(65) Prior Publication Data
US 2020/0314020 A1    Oct. 1, 2020

(51) Int. Cl.
| | |
|---|---|
| H04L 12/833 | (2013.01) |
| H04W 72/12 | (2009.01) |
| H04L 1/00 | (2006.01) |
| H04L 12/823 | (2013.01) |
| H04L 1/18 | (2006.01) |

(52) U.S. Cl.
CPC ............ *H04L 47/31* (2013.01); *H04L 1/009* (2013.01); *H04L 1/1874* (2013.01); *H04L 1/1887* (2013.01); *H04L 47/32* (2013.01); *H04W 72/1257* (2013.01)

(58) Field of Classification Search
CPC ......... H04L 1/205; H04L 69/04; H04L 12/56; H04L 12/28; H04W 4/00
See application file for complete search history.

(56) References Cited

U.S. PATENT DOCUMENTS

| | | | |
|---|---|---|---|
| 9,693,307 B2 | 6/2017 | Katz et al. | |
| 2011/0317770 A1* | 12/2011 | Lehtiniemi | H04N 19/42 375/240.25 |
| 2015/0156108 A1* | 6/2015 | Shi | H04L 12/4633 370/218 |
| 2018/0083858 A1* | 3/2018 | Cheshire | H04W 84/12 |

* cited by examiner

*Primary Examiner* — Iqbal Zaidi

(57) ABSTRACT

A wireless communication device selectively flushes frames from a processing pipeline on a per-user basis. The wireless communication device stores frames (e.g., physical layer service data units (PSDUs)) of data for processing at one or more queues, wherein each frame is stored with the tag of the user associated with the frame. In response to an exception, such as a detected error or a user-reset request, the wireless communication device changes the tag of the user associated with the exception. When a frame is selected from a queue for processing at a pipeline, the wireless communication device compares the stored tag associated with the frame with the current tag associated with the user corresponding to the frame. In response to a mismatch, the wireless communication device discards the frame.

23 Claims, 4 Drawing Sheets

EXCEPTION HANDLING IN A MULTI-USER WIRELESS COMMUNICATION DEVICE BASED ON USER TAG VALUES

BACKGROUND

Field of the Disclosure

The present disclosure relates generally to processing systems and more particularly to wireless communication devices.

Description of the Related Art

Wireless communication devices, such as wireless routers, network access points, and embedded Wi-Fi chips, are used in a wide variety of systems and devices to support wireless communication of data. For example, a wireless router can provide access to a wide-area network, such as the Internet, for a variety of devices, including smartphones, desktop and laptop computers, tablets, and the like. Historically, wireless communication devices were designed as single-user devices, wherein the antennas of a wireless communication device only communicate with a single other device, or user, at a given point in time. However, the number of electronic systems supporting wireless communication has substantially increased in recent years, increasing the user density of wireless networks, and in turn straining the resources of single-user wireless communication devices, leading to a poor user experience. Recent wireless communication standards, such as the 802.11ac/ax standards, provide a framework for multi-user wireless communication. However, conventional approaches to multi-user wireless communication do not address communication errors and channel reset conditions efficiently, resulting in high consumption of system resources, including power.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for selectively flushing frames from a processing pipeline of a wireless communication device on a per-user basis. The wireless communication device can be a multi-user communication device that assigns a tag to each user. The wireless communication device stores frames (e.g., physical layer service data units (PSDUs)) of data for processing at one or more queues, wherein each frame is stored with the tag of the user associated with the frame. In response to an exception, such as a detected error or a user-reset request, the wireless communication device changes the tag of the user associated with the exception. When a frame is selected from a queue for processing at a pipeline, the wireless communication device compares the stored tag associated with the frame with the current tag associated with the user corresponding to the frame. In response to a mismatch, the wireless communication device discards the frame. Thus, in response to an exception, frames can be selectively flushed from the pipeline on a per-user basis, rather than flushing all frames for all users from the pipeline. Selectively flushing in this manner reduces consumption of device resources, such as power, and improves processing efficiency at the wireless communication device.

Figure 1:
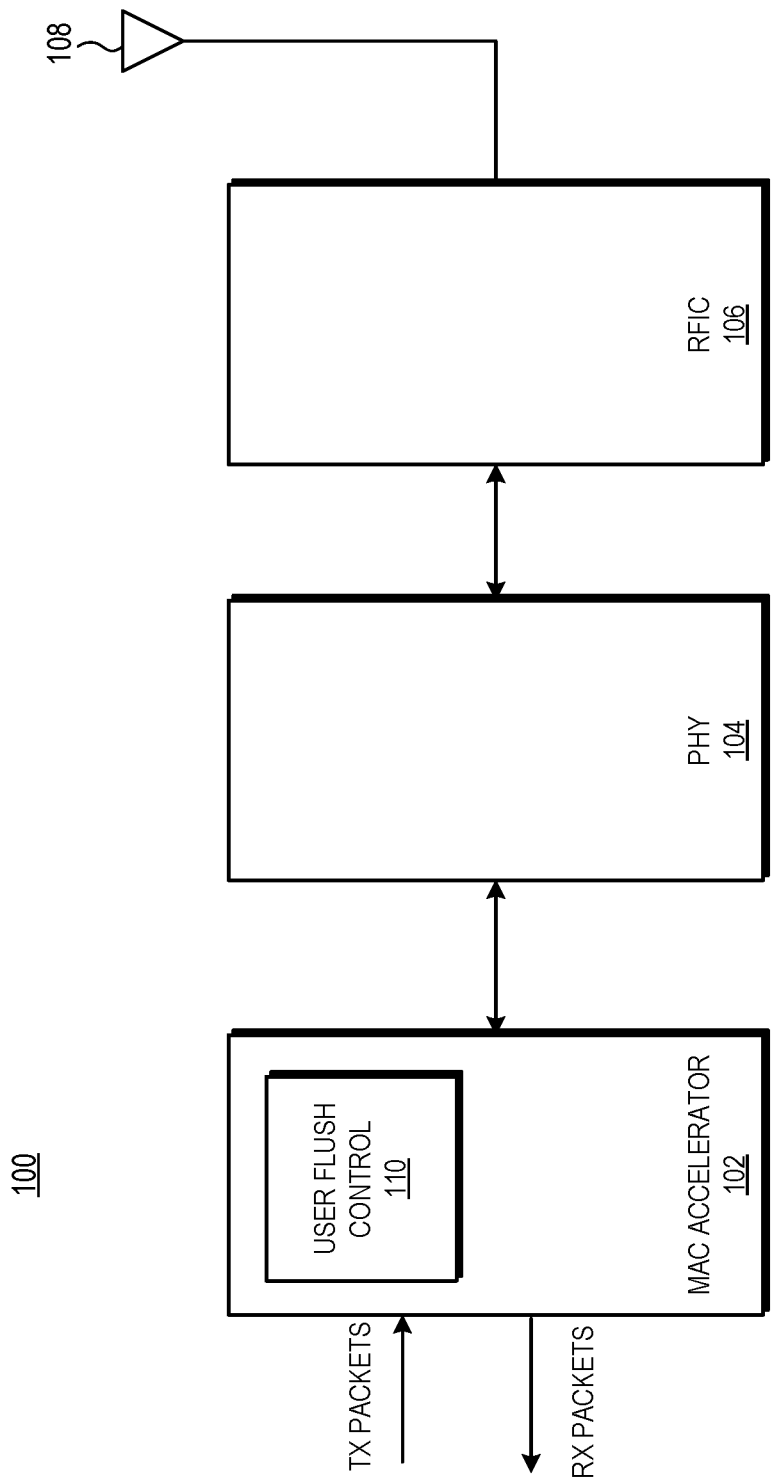
FIG. 1 is a block diagram of a wireless communication device that selectively flushes frames from a processing pipeline on a per-user basis in accordance with at least one embodiment.

Turning to the Figures, FIG. 1 illustrates a block diagram of a wireless communication device 100 in accordance with at least one embodiment. The wireless communication device 100 can be any device configured to communicate wirelessly with another device or a network of devices. Thus, the wireless communication device 100 can be a wireless router, a wireless network card or chip used by a desktop or laptop computer, by a portable device such as smartphone or tablet, and the like. For purposes of further description, it is assumed that the wireless communication device 100 is a wireless router generally configured to communicate with a wireless network, such as a wireless local area network (WLAN) and a wide area network such as the Internet. It is further assumed that the wireless communication device 100 is configured to comply with a wireless communication standard, such as one or more of the Institute of Electrical and Electronics Engineers (IEEE) 802.11 standards.

The wireless communication device 100 is further assumed to be a multi-user wireless communication device. Thus, the wireless communication device 100 is generally configured to concurrently communicate with multiple users via one or more communication channels, such as according to the IEEE 802.11n, IEEE 802.11ac, or 802.11ax standards. As is understood by one skilled in the art, each user can be a different device, a different entity (e.g. user account) of multiple entities using a single device (e.g. different virtual machines executing at a single server), and the like, or a combination thereof. To support multi-user wireless communication, the wireless communication device includes a media access control (MAC) accelerator 102, a physical layer 104, a radio-frequency integrated circuit (RFIC) and an antenna 108. The MAC accelerator 102 is generally configured to receive from a processor (not shown) or other device packets (Tx packets) for transmission via the network and is further configured to receive data from the network and provide packets (Rx packets) based on the received data to the processor. Accordingly, the MAC accelerator 102 includes one or more pipelines, as described further herein, to perform one or more operations associated with the MAC layer of communication on PSDUs (frames), including cyclic redundancy check (CRC) error detection for the Tx and Rx packets, frame aggregation operations (e.g., MAC service data unit (MSDU), MAC protocol data unit (MPDU) operations, and A-MPDU/MSDU operations) and the like.

The PHY 104 includes one or more circuits generally configured to perform physical layer operations for the wireless communication device 100, such as encoding data for transmission, decoding of received data, scrambling and descrambling of data, alignment marker insertion and removal, bit timing, signal encoding, and the like. In performing these operations, the PHY 104 controls the RFIC 106, which includes circuitry to transmit and receive data via the antenna 108. In at least one embodiment, the antenna 108 represents multiple antennas, supporting multiple channels of communication for the wireless communication device 100.

Returning to the MAC accelerator 102, as noted above the wireless communication device 100 is a multi-user wireless communication device, such that data for different users can be concurrently transmitted, and concurrently received, via the antenna 108, the RFIC 106, and the PHY 104. Accordingly, each PSDU processed by the MAC accelerator 102 is associated with a different user. Under specified conditions, the MAC accelerator 102 identifies an exception for one or more users, indicating that the PSDUs for the one or more users are no longer valid. For example, the MAC accelerator 102 can identify an exception in response to detecting a communication error for a channel of the wireless communication device 102, in response to an indication of reset condition associated with a user or set of users, and the like. An exception can be identified by the MAC accelerator 102 directly, based on one or more of the PSDUs being processed, or in response to signaling from another module of the wireless communication device 102, such as in response to an indication from a processor of the wireless communication device 102.

To conserve processing resources, the MAC accelerator 102 is generally configured to flush, from one or more pipeline queues (not shown at FIG. 1) PSDUs associated with an exception. In particular, the MAC accelerator 102 includes a user flush control module 110 that is configured, as described further herein, to flush PSDUs on a per user basis, so that only PSDUs are flushed that are associated with the user corresponding to the exception. Thus, for example, in response to an exception indicating a user reset, the user flush control module 110 is configured to flush from the processing pipelines those PSDUs that 1) were received prior to the indicated exception; and 2) are associated with the user corresponding to the user reset. In contrast, a conventional MAC accelerator flushes all packets for all users in response to an exception, thereby consuming more resources for the flush operation and delaying processing of frames for users not associated with the exception.

Figure 2:
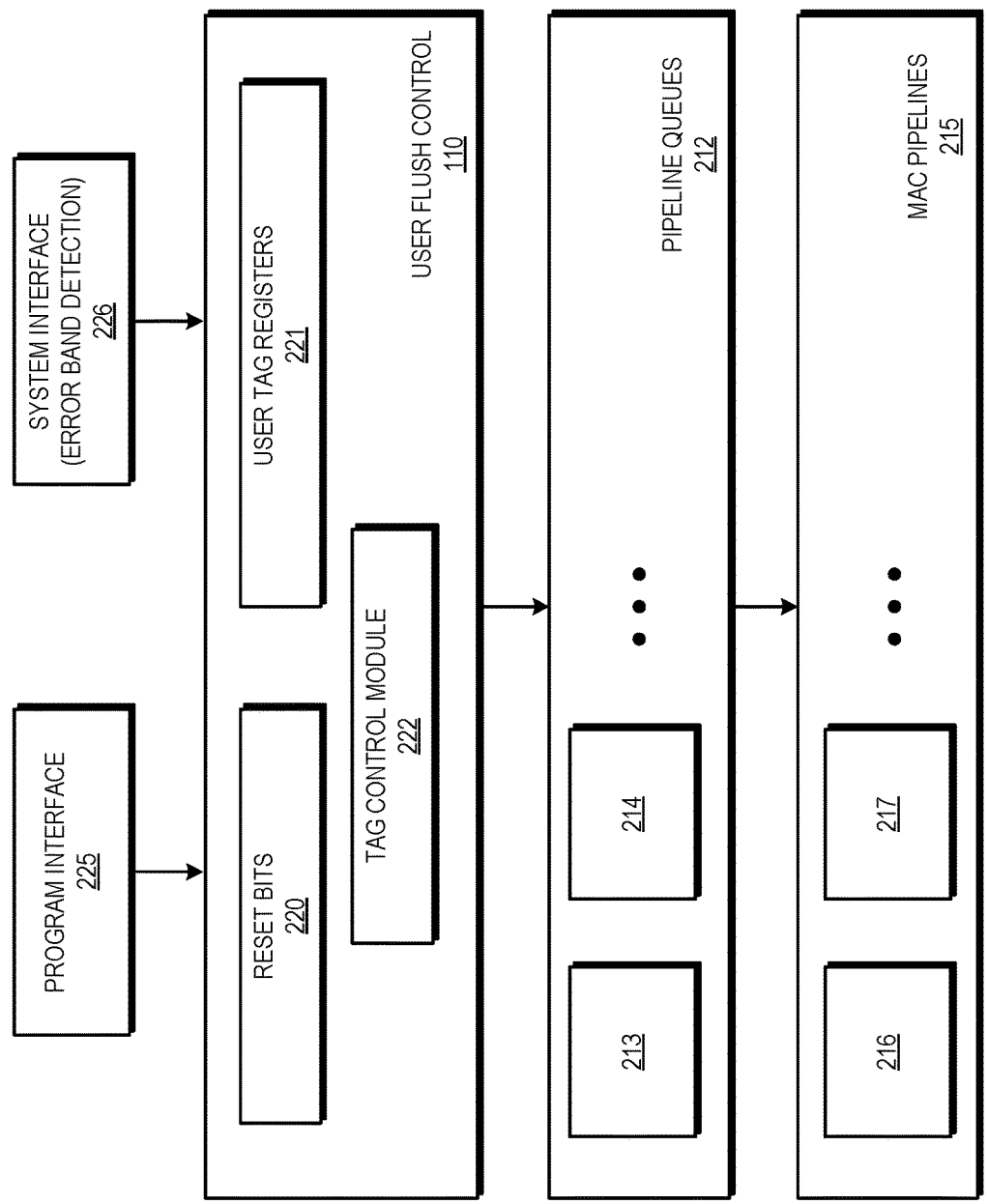
FIG. 2 is a block diagram of a MAC accelerator of the wireless communication device of FIG. 1 in accordance with at least one embodiment.

Flushing of PSDUs on a per-user basis can be better understood with reference to FIG. 2, which illustrates additional modules of the MAC accelerator 102 in accordance with at least one embodiment. In the depicted embodiment, the MAC accelerator 102 includes the user flush control module 110, pipeline queues 212, MAC pipelines 215, a program interface 225, and a system interface 226. The MAC pipelines 215 are a set of processing pipelines (e.g., pipeline 216, pipeline 217) wherein each pipeline is configured to process PSDUs to carry out specified MAC layer operations. Thus, for example, in at least one embodiment the MAC pipelines 215 include a pipeline to perform CRC operations on PSDUs, a pipeline to perform multi-user MPDU/MSDU operations, and a pipeline to perform A-MPDU operations. The pipeline queues 212 include a set of queues (e.g., queues 213, 214) each configured to store PSDUs for processing at the MAC pipelines 215. In at least one embodiment, different ones of the pipeline queues stored PSDUs for processing at the MAC pipelines 215. In other embodiments, one or more of the MAC pipelines 215 shares one or more of the pipeline queues 212.

The user flush control module 110 is generally configured to flush PSDUs from the MAC accelerator 102 in response to exceptions indicated by one or more of the program interface 225 and the system interface 226. In at least one embodiment, the program interface 225 provides an interface between the MAC accelerator and software executing at the wireless communication device 100. Accordingly, the program interface 225 can provide indications of exceptions generated by the executing software, such reset requests for individual users associated with the wireless communication device 100. The system interface 226 is configured to provide indications of exceptions from hardware modules of the wireless communication device 100, such as exceptions indicating errors in a communication band associated with a user. In at least one embodiment, each exception indicates the user, or set of users associated with the exception.

To support flushing of PDUs in response to exceptions, the user flush control module includes reset bits 220, user tag registers 221, and a tag control module 222. The reset bits 220 are a set of bits wherein each reset bit corresponds to a different user, and wherein an asserted bit indicates that the PSDUs for the corresponding user are to be flushed. The user tag registers 221 are a set of registers wherein each tag register corresponds to a different user and stores a tag value associated with the corresponding user. The tag control module 222 is a set of circuits collectively configured to control flush operations for the MAC accelerator 222 as described further herein.

In operation, as a user is added to the MAC accelerator 102 (e.g. in response to a user being assigned a communication channel of the MAC accelerator 102) the tag control module 222 assigns a specified initial tag value to the user and stores the tag value in response to an indication of an exception by one of the program interface 225 and the system interface 226, the reset bit for the user 220 indicated by the exception is asserted. The MAC accelerator 102 stores each PSDU at the pipeline queues 212 with the tag value currently assigned to the user when the PSDU is stored.

In response to an indication of an exception by the program interface 225 or by the system interface 226, the reset bit for the user (or users) is asserted. In response to the reset bit being asserted, the tag control module 222 changes the tag value stored at the user tag register 221 corresponding to the user indicated by the reset bit. If multiple reset bits are set, the tag control module 222 changes the tag value for each user corresponding to the multiple reset bits. In at least one embodiment, the tag control module 222 changes the tag value for a user by incrementing the tag value stored at the corresponding register. In another embodiment, the tag control module 222 changes the tag value by selecting a new value from a list of predefined values. As described further below, by changing the tag value for a user, PSDUs associated with that user stored at the pipeline queues 212 are placed in a discard state, such that they will be flushed from the pipeline queues 212 and not processed at the MAC pipelines 215.

In different embodiments, the MAC accelerator 102 can flush PSDUs in the discard state (that is, PSDUs having tag values that do not match the current tag for the corresponding user) in different ways. In one embodiment, each time a stage of one of the MAC pipelines 215 retrieves a PSDU for processing, the pipeline stage compares the tag value of the retrieved PSDU to the current tag value stored at the user tag registers 221 for the user associated with the retrieved PSDU. If the tag values match, the stage processes the PSDU. If the tag values do not match, the pipeline stage does not process the PSDU and the PSDU is not re-stored at the pipeline queues 212, thereby discarding the PSDU. In another embodiment, in response to changing a tag value at the user tag registers 221 for a given user, the tag control module 222 checks each entry of the pipeline queues 212. For each entry storing a PSDU associated with the given user, the tag control module 222 compares the tag value stored at the entry with the tag value stored at the user tag registers 221 and in response to a mismatch removes the PSDU from the entry (e.g. by overwriting the entry with a specified NULL value), thereby discarding the PSDU.

Figure 3:
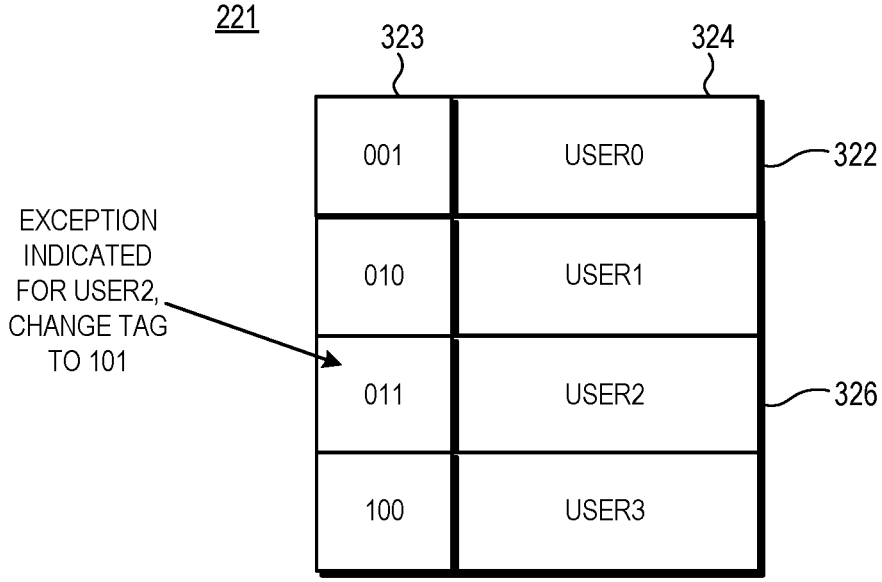
FIG. 3 is a block diagram illustrating an example of changing a user tag value at the MAC accelerator of FIG. 2 in accordance with at least one embodiment.

FIG. 3 illustrates a block diagram of an example of the tag control module 222 changing the tag value for a user in accordance with at least one embodiment. FIG. 3 illustrates an embodiment of the user tag registers 221 including a different tag register (e.g. registers 322, 323) associated with a different user of the wireless communication device 100. Each tag register includes a tag field 323 and a user field 324, wherein the user field 324 indicates the user associated with the tag register and the tag field 323 indicates the tag value assigned to the user. Thus, in the illustrated example, tag register 322 is assigned to USER0 and USER0 has been assigned a tag value of 001. In other embodiments, the user field 324 is omitted, and each tag register is assigned to a different user based on a specified assignment scheme. Thus, for example, tag register 322 is specified as always assigned to USER0.

For the example of FIG. 3, it is assumed that an exception has been indicated to the user flush control module 110 for a user designated USER2. In response to the indicated exception, the tag control module 222 identifies the tag value register 326 as assigned to USER2 (as indicated by user field 324), selects a new tag value of 101 for USER2 and stores the new tag value at the tag field of register 326. PSDUs at the pipeline queues 212 associated with USER2 are thereby placed in a discard state, as those PSDUs are stored at the pipeline queues 212 with the old tag value of 011. PSDUs for USER2 received subsequent to the exception are stored at the pipeline queues 212 are stored with the new tag value 101, and therefore will not be discarded.

Figure 4:
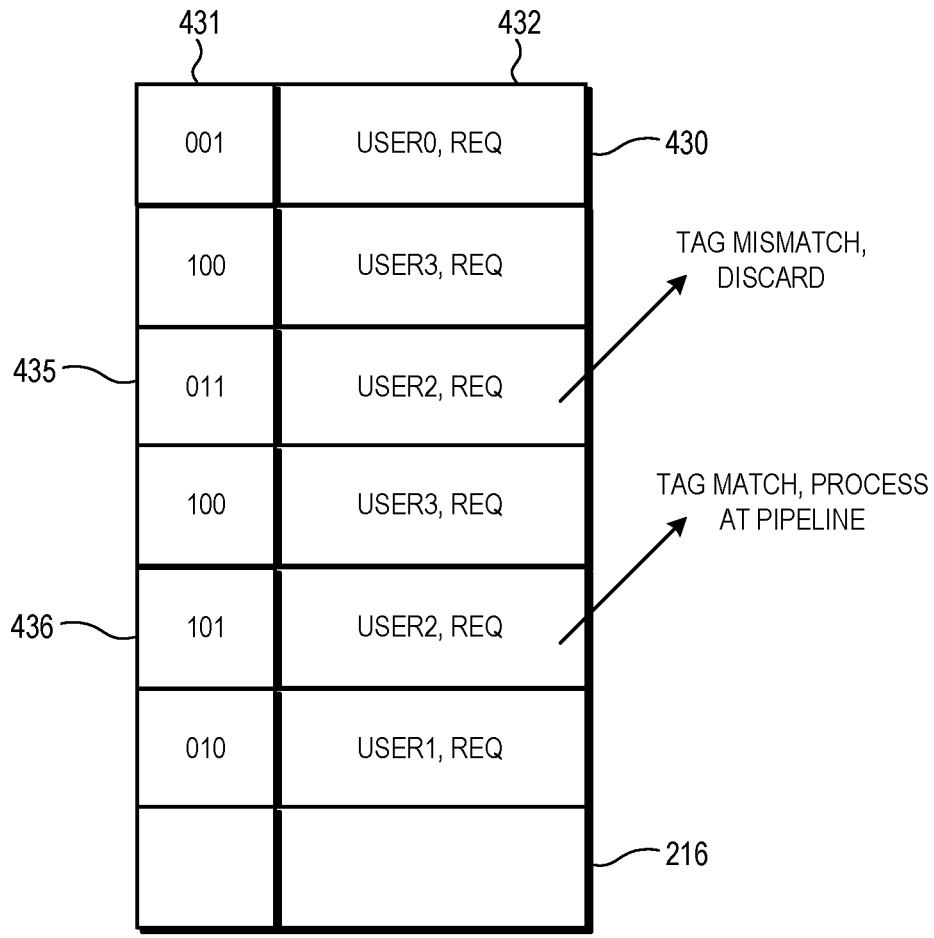
FIG. 4 is a block diagram illustrating an example of discarding a frame from a pipeline queue based on a user tag in accordance with at least one embodiment.

FIG. 4 illustrates an example of flushing PSDUs from pipeline queue 216 of the pipeline queues 212 on a per-user basis in accordance with at least one embodiment. In the depicted embodiment, the pipeline queue 216 includes a plurality of entries (e.g., entries 430, 435, 436). Each entry includes a tag field 431 and a PSDU field 432, wherein the PSDU field for an entry stores a PSDU and the tag field 431 stores the current tag value for the user associated with the PSDU when the PSDU was stored at the entry. It will be appreciated that in the illustrated example the user associated with a PSDU is indicated by the PSDU and is therefore indicated by the PSDU field 432.

For the embodiment of FIG. 4, it is assumed that the tag value for USER2 has been changed by the tag control module 222, in response to an indicated exception, from 011 to 101. Thus, in the illustrated example, entry 435 is in a discard state, as it stores a PSDU for USER2 stored prior to the exception indication, and therefore stores the old tag value of 011. Entry 436, in contrast, stores a PSDU for USER2 received and stored after the indicated exception, and therefore stores the current tag value of 101.

Each time a pipeline stage of the MAC pipelines 215 retrieves a PSDU from an entry of the pipeline queue 216 for processing, the pipeline stage compares the tag value for the retrieved entry to the current tag value for the user and in response to a mismatch discards the retrieved PSDU without further processing. Thus, in response to retrieving the PSDU from entry 435, the pipeline stage determines that the stored tag value of 011 does not match the current tag value of 101 for USER2 and therefore discards the PSDU, thereby flushing the PSDU from the MAC accelerator 102. In response to retrieving the PSDU from entry 436, the pipeline stage determines that the stored tag value of 101 matches the current tag value of 101 for USER2, and therefore processes the PSDU. Thus, only PSDUs associated with old tag values are flushed from the pipeline queues 212. Further, PSDUs for other users are not flushed from the pipeline queues 212 based on the exception associated with USER2, thereby conserving system resources.

Figure 5:
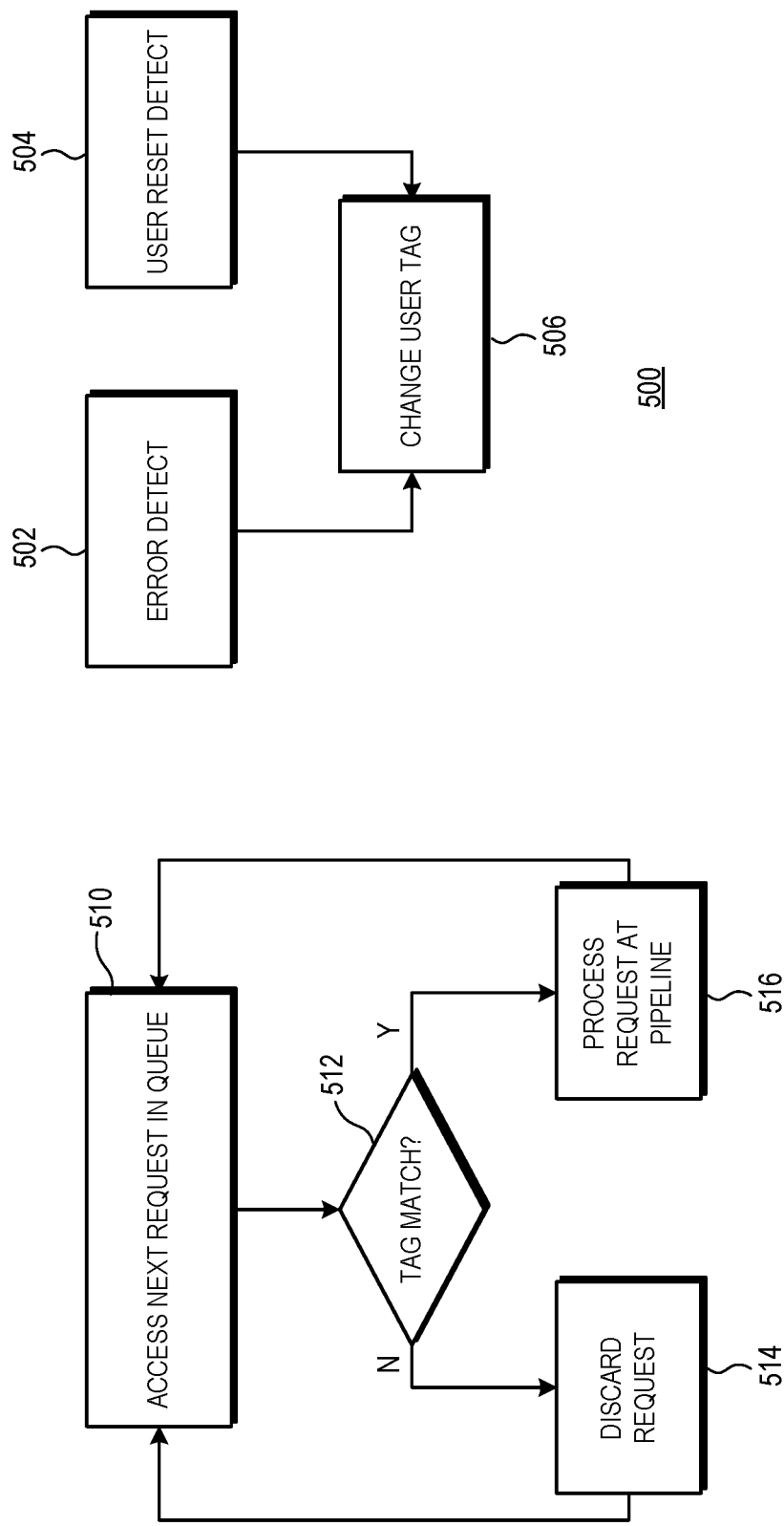
FIG. 5 is a flow diagram of a method of selectively flushing frames from a processing pipeline of a wireless communication device on a per-user basis in accordance with at least one embodiment.

FIG. 5 is a flow diagram of a method 500 of flushing frames from a wireless communication device in accordance with at least one embodiment. For purposes of description, the method 500 is described with respect to an example implementation at the wireless communication device 100. In addition, it is assumed for purposes of description that blocks 502-506 of the method 500 can be executed concurrent with the blocks 510-516 as described further below.

At block 502 the wireless communication device 100 monitors communication channels for errors, such as high signal-to-noise ratios, detected CRC or other errors in data packets, and the like. In response to a detected error, the wireless communication device 100 indicates an exception to the user flush control module 110 via the system interface 226. In addition, and concurrently, at block 504 software executing at the wireless communication device 100 monitors for a reset condition associated with a user. Examples of reset conditions can include a software detected error associated with the user, a reset request from the user, and the like. In response to detecting a reset condition, the software indicates an exception to the user flush control module 110 via the program interface 225. At block 506, in response to one or both of an indicated exception received via the system program interface 225 or the system interface 226, the user flush control module 110 sets the reset bit for the user associated with the exception. In response, the tag control module 222 changes the tag value for the user stored at the user tag registers 221.

Concurrent with blocks 502-506, at block 510, a pipeline stage of the pipelines 225 accesses the next entry of a given pipeline queue, such as pipeline queue 226. At block 512, the pipeline stage compares the tag value stored at the retrieved entry with the tag value for the user of the retrieved entry stored at the user tag registers 221. In response to a mismatch, the method flow moves to block 514 and the pipeline stage discards the PSDU stored at the accessed entry, so that the PSDU is no longer processed at the wireless communication device 100. If, at block 512, the accessed tag matches the stored tag for the user, the method flow moves to block 516 and the pipeline stage processes the PSDU at the accessed entry.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A wireless communication device, comprising:
   a first pipeline queue configured to store a plurality of frames for a plurality of users at a wireless communication device, the plurality of users including a first user;
   tag control circuitry configured to, in response to detecting a first exception associated with the first user, adjust a tag value associated with the first user from a first value to a second value; and
   a first pipeline configured to discard a first frame of the plurality of frames from the first pipeline queue based on the tag value associated with the first user having the second value, wherein:
      the tag control circuitry is configured to, in response to detecting a second exception associated with a second user, adjust a tag value associated with the second user from a third value to a fourth value; and
      the first pipeline is configured to discard a second frame of the plurality of frames from the first pipeline queue based on the tag value associated with the second user having the fourth value.

2. The wireless communication device of claim 1, wherein the pipeline is configured to:
   process a third frame of the plurality of frames based on the tag value associated with the first user having the first value.

3. The wireless communication device of claim 1, wherein the tag control circuitry is configured to adjust the tag value associated with the first user by:
   adjusting the tag value associated with the first user in response to detecting an error in a communication band associated with the first user.

4. The wireless communication device of claim 1, wherein the tag control circuitry is configured to adjust the tag value associated with the first user by:
   adjusting the tag value in response to a reset request from software executing at the wireless communication device.

5. The wireless communication device of claim 1, further comprising:
   a second pipeline configured to discard a third frame of the plurality of frames from a second pipeline queue of the wireless communication device based on the tag value associated with the first user having the second value.

6. The wireless communication device of claim 1, wherein the first pipeline is configured to:
   discard the first frame in response to detecting a difference between a tag associated with the first frame and the tag associated with the first user.

7. A wireless communication device comprising:
   a first pipeline queue configured to store a plurality of frames for a plurality of users at a wireless communication device, the plurality of users including a first user;
   tag control circuitry configured to, in response to detecting a first exception associated with the first user, adjust a tag value associated with the first user from a first value to a second value; and
   a first pipeline configured to discard a first frame of the plurality of frames from the first pipeline queue based on the tag value associated with the first user having the second value, wherein:
      the tag control circuitry is configured to adjust the tag value associated with the first user by:
         setting a reset bit associated with the first user in response to detecting the error; and
         adjusting the tag value associated with the first user in response to detecting that the reset bit is set.

8. The wireless communication device of claim 7, wherein:
   the tag control module is configured to, in response to detecting a second exception associated with a second user, adjust a tag value associated with the second user from a third value to a fourth value; and the first pipeline is configured to discard a second frame of the plurality of frames from the first pipeline queue based on the tag value associated with the second user having the fourth value.

9. The wireless communication device of claim 7, wherein the pipeline is configured to:
process a second frame of the plurality of frames based on the tag value associated with the first user having the first value.

10. The wireless communication device of claim 7, further comprising:
a second pipeline configured to discard a second frame of the plurality of frames from a second pipeline queue of the wireless communication device based on the tag value associated with the first user having the second value.

11. The wireless communication device of claim 7, wherein the first pipeline is configured to:
discard the first frame in response to detecting a difference between a tag associated with the first frame and the tag associated with the first user.

12. A method comprising:
storing a plurality of frames for a plurality of users at a first pipeline queue at a wireless communication device, the plurality of users including a first user;
in response to detecting a first exception associated with the first user, adjusting a tag value associated with the first user from a first value to a second value; and
discarding a first frame of the plurality of frames from the first pipeline queue based on a mismatch between the tag value associated with the first user having the second value, wherein:
the first exception is based on an error in a communication band associated with the first user, and
adjusting the tag value further comprises:
setting a reset bit associated with the first user; and
adjusting the tag value associated with the first user in response to detecting that the reset bit is set.

13. The method of claim 12, further comprising:
processing a second frame of the plurality of frames based on the tag value associated with the first user having the first value.

14. The method of claim 12, wherein the first exception is based on a reset request from software executing at the wireless communication device.

15. The method of claim 12, further comprising:
discarding a first frame of the plurality of frames from a second pipeline queue of the wireless communication device based on the tag value associated with the first user having the second value.

16. The method of claim 12, wherein discarding the first frame comprises:
discarding the first frame in response to detecting a difference between a tag associated with the first frame and the tag associated with the first user.

17. A method comprising:
storing a plurality of frames for a plurality of users at a first pipeline queue at a wireless communication device, the plurality of users including a first user;
in response to detecting a first exception associated with the first user, adjusting a tag value associated with the first user from a first value to a second value;
discarding a first frame of the plurality of frames from the first pipeline queue based on a mismatch between the tag value associated with the first user having the second value;
in response to detecting a second exception associated with a second user, adjusting a tag value associated with the second user from a third value to a fourth value; and
discarding a second frame of the plurality of frames from the first pipeline queue based on the tag value associated with the second user having the fourth value.

18. The method of claim 17, wherein the first exception is based on an error in a communication band associated with the first user.

19. The method of claim 18, wherein adjusting the tag value further comprises:
setting a reset bit associated with the first user; and
adjusting the tag value associated with the first user in response to detecting that the reset bit is set.

20. The method of claim 17, further comprising:
processing a third frame of the plurality of frames based on the tag value associated with the first user having the first value.

21. The method of claim 17, wherein the first exception is based on a reset request from software executing at the wireless communication device.

22. The method of claim 17, further comprising:
discarding a third frame of the plurality of frames from a second pipeline queue of the wireless communication device based on the tag value associated with the first user having the second value.

23. The method of claim 17, wherein discarding the first frame comprises:
discarding the first frame in response to detecting a difference between a tag associated with the first frame and the tag associated with the first user.

\* \* \* \* \*